US007507156B2

(12) United States Patent
Nicely

(10) Patent No.: US 7,507,156 B2
(45) Date of Patent: Mar. 24, 2009

(54) GAMING DEVICE PROVIDING AN OPPORTUNITY TO RECEIVE AWARDS WHICH VARY WITH DIFFERENT NON-MAX BETS

(75) Inventor: Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/145,846

(22) Filed: Jun. 6, 2005

(65) Prior Publication Data

US 2005/0282625 A1 Dec. 22, 2005

Related U.S. Application Data

(60) Provisional application No. 60/577,236, filed on Jun. 4, 2004.

(51) Int. Cl.
*A63F 13/00* (2006.01)
*A63F 9/24* (2006.01)

(52) U.S. Cl. ............................ 463/25; 463/20; 463/26; 463/27

(58) Field of Classification Search ..................... 463/1, 463/16–17, 20, 25, 29, 40–42; 273/138.1–2, 273/142 A, 143 R
See application file for complete search history.

(56) References Cited

U.S. PATENT DOCUMENTS 4,238,127 A 12/1980 Lucero et al.
4,582,324 A 4/1986 Koza et al.
4,991,848 A 2/1991 Greenwood et al.
5,116,055 A 5/1992 Tracy
5,123,649 A 6/1992 Tiberio
5,178,390 A 1/1993 Okada
5,275,400 A * 1/1994 Weingardt et al. ............ 463/12
5,280,909 A 1/1994 Tracy (Continued)

FOREIGN PATENT DOCUMENTS

AU 199747626 6/1998

(Continued)

OTHER PUBLICATIONS

All That Glitters Article, written by Strictly Slots, published in Dec. 2004.

(Continued)

*Primary Examiner*—Robert E Pezzuto
*Assistant Examiner*—Ryan Hsu
(74) *Attorney, Agent, or Firm*—Bell, Boyd & Lloyd LLP

(57) ABSTRACT

The disclosed device and method comprise configuring a gaming device to offer one or more “As Is” prizes when a bet at a threshold limit less than a maximum bet is placed without apparently or actually reducing the expected return to player (“ERTP”) on bets larger than the threshold limit. In one version, one or more standard awards are sweetened for bets less than the maximum amount. In an alternative version, multiple “As Is” prizes are provided. Players are eligible for each “As Is” prize based on an amount of their wager. Consequently, to be eligible for a first “As Is” prize the player may need to place a first wager amount and to be eligible for a second “As Is” prize the player may need to place a second wager amount greater than the first amount.

37 Claims, 10 Drawing Sheets

U.S. PATENT DOCUMENTS

| | | | | |
|---|---|---|---|---|
| 5,286,023 | A | 2/1994 | Wood | |
| 5,344,144 | A | 9/1994 | Canon | |
| 5,380,007 | A | 1/1995 | Travis et al. | |
| 5,524,888 | A | 6/1996 | Heidel | |
| 5,536,016 | A | 7/1996 | Thompson | |
| 5,542,669 | A | 8/1996 | Charron et al. | |
| 5,551,692 | A | 9/1996 | Pettit et al. | |
| 5,611,730 | A | 3/1997 | Weiss | |
| 5,645,486 | A | 7/1997 | Nagao et al. | |
| 5,655,961 | A | 8/1997 | Acres et al. | |
| 5,702,304 | A | 12/1997 | Acres et al. | |
| 5,709,603 | A | 1/1998 | Kaye | |
| 5,711,525 | A | 1/1998 | Breeding | |
| 5,741,882 | A | 4/1998 | Acres et al. | |
| 5,752,882 | A | 5/1998 | Acres et al. | |
| 5,766,076 | A | 6/1998 | Pease et al. | |
| 5,788,573 | A | 8/1998 | Baerlocher | |
| 5,807,172 | A | 9/1998 | Piechowiak | |
| 5,820,459 | A | 10/1998 | Acres et al. | |
| 5,833,538 | A | 11/1998 | Weiss | |
| 5,836,817 | A | 11/1998 | Acres et al. | |
| 5,855,515 | A | 1/1999 | Pease et al. | |
| 5,868,619 | A * | 2/1999 | Wood et al. | 463/13 |
| 5,876,284 | A | 3/1999 | Acres et al. | |
| 5,885,158 | A | 3/1999 | Torango et al. | |
| 5,902,048 | A | 5/1999 | Bennett et al. | |
| 5,910,048 | A | 6/1999 | Feinberg | |
| 5,941,773 | A | 8/1999 | Harlick | |
| 5,947,820 | A | 9/1999 | Morro et al. | |
| 5,967,894 | A | 10/1999 | Kinoshita et al. | |
| 5,980,384 | A | 11/1999 | Barrie | |
| 5,989,121 | A * | 11/1999 | Sakamoto | 463/20 |
| 5,997,401 | A | 12/1999 | Crawford | |
| 6,012,982 | A | 1/2000 | Piechowiak et al. | |
| 6,032,955 | A * | 3/2000 | Luciano et al. | 273/138.1 |
| 6,033,307 | A | 3/2000 | Vancura | |
| 6,059,289 | A | 5/2000 | Vancura | |
| 6,062,980 | A | 5/2000 | Luciano | |
| 6,110,041 | A | 8/2000 | Walker et al. | |
| 6,110,043 | A | 8/2000 | Olsen | |
| 6,117,012 | A | 9/2000 | McCrea, Jr. | |
| 6,129,632 | A | 10/2000 | Luciano | |
| 6,146,273 | A | 11/2000 | Olsen | |
| 6,155,925 | A | 12/2000 | Giobbi et al. | |
| 6,159,097 | A | 12/2000 | Gura | |
| 6,159,098 | A | 12/2000 | Slominary et al. | |
| 6,162,122 | A | 12/2000 | Acres et al. | |
| 6,176,233 | B1 | 1/2001 | Sunaga et al. | |
| 6,186,894 | B1 | 2/2001 | Mayeroff | |
| 6,203,429 | B1 | 3/2001 | Demar et al. | |
| 6,224,483 | B1 | 5/2001 | Mayeroff | |
| 6,231,442 | B1 | 5/2001 | Mayeroff | |
| 6,231,445 | B1 | 5/2001 | Acres et al. | |
| 6,241,608 | B1 | 6/2001 | Torango | |
| 6,244,957 | B1 | 6/2001 | Walker et al. | |
| 6,244,958 | B1 | 6/2001 | Acres | |
| 6,295,337 | B1 | 9/2001 | Therenin et al. | |
| 6,315,289 | B1 * | 11/2001 | Sakamoto et al. | 273/121 B |
| 6,322,445 | B1 | 11/2001 | Miller | |
| 6,334,612 | B1 | 1/2002 | Wurz et al. | |
| 6,358,147 | B1 | 3/2002 | Jaffe | |
| 6,375,569 | B1 | 4/2002 | Acres | |
| 6,435,968 | B1 | 8/2002 | Torango | |
| 6,454,651 | B1 * | 9/2002 | Yoseloff | 463/25 |
| RE37,885 | E | 10/2002 | Acres et al. | |
| 6,468,156 | B1 * | 10/2002 | Hughs-Baird et al. | 463/25 |
| 6,592,460 | B2 | 7/2003 | Torango | |
| 6,599,193 | B2 * | 7/2003 | Baerlocher et al. | 463/27 |
| 6,626,758 | B1 | 9/2003 | Parham | |
| 6,656,048 | B2 * | 12/2003 | Olsen | 463/25 |
| 6,712,695 | B2 * | 3/2004 | Mothwurf et al. | 463/25 |
| 6,726,564 | B2 * | 4/2004 | Hogan et al. | 463/25 |
| 6,726,565 | B2 | 4/2004 | Hughs-Baird | |
| 6,869,357 | B2 | 3/2005 | Adams et al. | |
| RE38,812 | E | 10/2005 | Acres et al. | |
| 7,029,395 | B1 * | 4/2006 | Baerlocher | 463/20 |
| 7,056,215 | B1 | 6/2006 | Olive | |
| 7,077,746 | B2 | 7/2006 | Torango | |
| 7,108,603 | B2 | 9/2006 | Olive | |
| 7,255,645 | B2 | 8/2007 | Olive | |
| 2002/0042297 | A1 | 4/2002 | Torango | |
| 2003/0032475 | A1 * | 2/2003 | Yoseloff | 463/25 |
| 2003/0060266 | A1 | 3/2003 | Baerlocher | |
| 2003/0060279 | A1 | 3/2003 | Torango | |
| 2003/0069068 | A1 | 4/2003 | Kaminkow | |
| 2003/0181231 | A1 | 9/2003 | Vancura et al. | |
| 2003/0216166 | A1 | 11/2003 | Baerlocher et al. | |
| 2004/0009811 | A1 | 1/2004 | Torango | |
| 2004/0048644 | A1 | 3/2004 | Gerrard et al. | |
| 2004/0063492 | A1 | 4/2004 | Baerlocher et al. | |
| 2004/0183256 | A1 | 9/2004 | Ko | |
| 2005/0054429 | A1 | 3/2005 | Baerlocher et al. | |
| 2005/0060050 | A1 | 3/2005 | Baerlocher | |
| 2005/0079911 | A1 | 4/2005 | Nakatsu | |
| 2005/0096123 | A1 | 5/2005 | Cregan et al. | |
| 2005/0119047 | A1 | 6/2005 | Olive | |
| 2005/0143168 | A1 | 6/2005 | Torango | |
| 2005/0176488 | A1 | 8/2005 | Olive | |
| 2005/0209004 | A1 | 9/2005 | Torango | |
| 2005/0239542 | A1 | 10/2005 | Olsen | |
| 2005/0282625 | A1 | 12/2005 | Nicely | |
| 2006/0030399 | A1 | 2/2006 | Baerlocher | |
| 2006/0030403 | A1 | 2/2006 | Lafky et al. | |
| 2006/0040721 | A1 | 2/2006 | Cuddy et al. | |
| 2006/0040723 | A1 | 2/2006 | Baerlocher et al. | |
| 2006/0040732 | A1 | 2/2006 | Baerlocher et al. | |
| 2006/0040733 | A1 | 2/2006 | Baerlocher et al. | |
| 2006/0040734 | A1 | 2/2006 | Baerlocher et al. | |
| 2006/0040736 | A1 | 2/2006 | Baerlocher et al. | |
| 2006/0063584 | A1 | 3/2006 | Brill et al. | |
| 2006/0087082 | A1 | 4/2006 | Ko | |
| 2006/0128457 | A1 | 6/2006 | Cannon | |
| 2006/0183535 | A1 | 8/2006 | Marks et al. | |
| 2007/0026923 | A1 | 2/2007 | Muir | |
| 2007/0054726 | A1 | 3/2007 | Muir et al. | |
| 2007/0054733 | A1 | 3/2007 | Baerlocher | |
| 2007/0054738 | A1 | 3/2007 | Muir | |
| 2007/0060271 | A1 | 3/2007 | Cregan et al. | |
| 2007/0060292 | A1 | 3/2007 | Peterson | |
| 2007/0060314 | A1 | 3/2007 | Baerlocher et al. | |
| 2007/0060321 | A1 | 3/2007 | Vasquez et al. | |
| 2007/0099696 | A1 | 5/2007 | Nguyen et al. | |
| 2007/0105619 | A1 | 5/2007 | Kniesteadt et al. | |
| 2007/0184887 | A1 | 8/2007 | Cannon | |
| 2007/0191088 | A1 | 8/2007 | Breckner et al. | |
| 2007/0218975 | A1 | 9/2007 | Iddings et al. | |
| 2007/0218982 | A1 | 9/2007 | Baerlocher | |
| 2007/0298874 | A1 | 12/2007 | Baerlocher et al. | |
| 2007/0298875 | A1 | 12/2007 | Baerlocher et al. | |

FOREIGN PATENT DOCUMENTS

| | | |
|---|---|---|
| AU | 199858216 | 8/1998 |
| AU | 199881994 | 2/1999 |
| AU | 199884162 | 3/1999 |
| WO | WO 00/32286 | 6/2000 |

OTHER PUBLICATIONS

*Aristocrat Technologies et al.* v. *International Game Technology et al.* Answer and Counterclaims of Defendants—Case No. 3:06-cv-03714-MJJ, pp. 24-29, filed Jun. 16, 2006.

Aristocrat Buyer's Guide with Aces Advertisement, 2 pages, published Mar.-May 1989.

Aristocrat Buyer's Guide with Aces Advertisement, 3 pages, published Jun.-Aug. 1989.
Poker Machine Specification Section A, written by Ainsworth Nominees PTY. Ltd., published prior to Jun. 6, 2005.
Proprietary Information of the Ainsworth Group of Companies, written by Ainsworth Nominees PTY. Ltd, published in 1989.
Slots Review: Fair's Fortune, All that Glitters, Fistful of Dollars-Wild Shot Article [online] [retrieved on Jan. 14, 2008, available prior to Jun. 6, 2005]. Retrieved from the Internet at <URL: http://mitchell.casionocitytimes.com>.
WMS Max Your Edge Advertisement [online] [retrieved on Sep. 5, 2007, available prior to Jun. 6, 2005]. Retrieved from the Internet at <URL: www.wms.com>.
Ancient Chinese Secret Video Slots Advertisement, written by IGT, published in 2006.
Cash Express Advertisement, written by Aristocrat Leisure Industries Pty. Ltd., published prior to Jun. 6, 2005.
Double The Price Is Right Slots Article [online] [retrieved on Jan. 21, 2008, available prior to Jun. 6, 2005]. Retrieved from the Internet at <URL: http://www.igt.com>.
Hot Hot Penny Series Game Description [online] [retrieved on Jan. 21, 2008, available prior to Sep. 28, 2007.] Retrieved from the Internet at <URL: http://www.videoslotmachines.com>.
Jackpot Bingo Description [online] [retrieved on Apr. 12, 2001]. Retrieved from the Internet at <URL: http://www.csds.com>.
Jackpot Hunter Mystery Progressives Advertisement, written by IGT, published in 2005.
Jackpot Hunter Mystery Progressives Article [online] [retrieved on Jan. 21, 2008, available prior to Sep. 28, 2007]. Retrieved from the Internet at <URL: http://www.igt.com>.
MegaJackpots World's Largest Advertisement, written by IGT, published in 1998.
MegaJackpots Advertisement, written by IGT, published in 2006.
Powerball Odds & Prizes Game Description [online] [retrieved on Jul. 11, 2002]. Retrieved from the Internet at <URL: http://www.musl.com>.
Slot Machines A Pictorial History of the First 100 Years, Fifth Edition, pp. 19, 30-34, 43, 85-88 and 213, written by Marshall Fey, published in 1997.
Soul Train Mystery Progressives Advertisement, written by IGT, published in 2006.
Strictly Slots Magazine [online] [retrieved on in Sep. 2005]. Retrieved from the Internet at <URL: http://www.strictlyslots.com>.
The Dating Game Article, written by Strictly Slots, published in Aug. 2004.
The Price is Right Fort Knox Mystery Progressives Advertisement, written by IGT, published in 2006.
Wheel of Fortune Video Advertisement, written by IGT, published in 1999.
Zeus Game Description [online] [retrieved on Jan. 18, 2008, available prior to Sep. 28, 2007]. Retrieved from the Internet at <URL: http://www.wms.com>.

* cited by examiner

Jacks or Better Poker

| Wanted | 1 | 2 | 3 | 4 | 5 |
|---|---|---|---|---|---|
| Royal Flush | 250 | 500 | 750 | 1000 | 4000 |
| Straight Flush | 50 | 100 | 150 | 200 | 250 |
| Four of a Kind | 25 | 50 | 75 | 100 | 125 |
| Full House | 9 | 18 | 27 | 36 | 45 |
| Flush | 6 | 12 | 18 | 24 | 30 |
| Straight | 4 | 8 | 12 | 16 | 20 |
| Three of a Kind | 3 | 6 | 9 | 12 | 15 |
| Two Pair | 2 | 4 | 6 | 8 | 10 |
| Jacks or Better | 1 | 2 | 3 | 4 | 5 |

120

FIG. 3

Blazing 7's Expanded Paytable

| Outcome (510) | Wager Size 1 (502) | Wager Size 2 (504) |
|---|---|---|
| Three Flame 7s | 0 | 1000 |
| Three Red 7s | 0 | 150 |
| Three Mixed 7s | 0 | 100 |
| Three 3Bars | 60 | 60 |
| Three 2Bars | 40 | 40 |
| Three 1Bars | 20 | 20 |
| Three Mixed Bars | 10 | 10 |
| Three Blanks | 2 | 2 |

Award Size (512, 514)

FIG. 5

WINNER TAKES ALL PAY SCHEDULE - REGULAR FORM

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | JACKPOT | JACKPOT | JACKPOT | JACKPOT | JACKPOT | JACKPOT | JACKPOT | JACKPOT | JACKPOT |
| 7 | 100.00 | 330.00 | 560.00 | 790.00 | 1,020.00 | 1,250.00 | 1,480.00 | 1,710.00 | 1,940.00 | 2,170.00 |
| 6 | 12.00 | 42.50 | 73.00 | 103.50 | 134.00 | 164.50 | 195.00 | 225.50 | 256.00 | 286.50 |
| 5 | 4.00 | 9.50 | 15.00 | 20.50 | 26.00 | 31.50 | 37.00 | 42.50 | 48.00 | 53.50 |
| 4 | 2.00 | 5.25 | 8.50 | 11.75 | 15.00 | 18.25 | 21.50 | 24.75 | 28.00 | 31.25 |
| 3 | 0.40 | 0.85 | 1.30 | 1.75 | 2.20 | 2.65 | 3.10 | 3.55 | 4.00 | 4.45 |
| 2 | 0.20 | 0.45 | 0.70 | 0.95 | 1.20 | 1.45 | 1.70 | 1.95 | 2.20 | 2.45 |
| 1 | 0.10 | 0.25 | 0.40 | 0.55 | 0.75 | 0.85 | 1.00 | 1.15 | 1.30 | 1.45 |
| 0 | 1.25 | 3.60 | 5.95 | 8.30 | 10.65 | 13.00 | 15.35 | 17.70 | 20.05 | 22.40 |

AWARD AMOUNTS 710 701 707

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | | | | | | | | | |
| 7 | 100.00 | 230.00 | 230.00 | 230.00 | 230.00 | 230.00 | 230.00 | 230.00 | 230.00 | 230.00 |
| 6 | 12.00 | 30.50 | 30.50 | 30.50 | 30.50 | 30.50 | 30.50 | 30.50 | 30.50 | 30.50 |
| 5 | 4.00 | 5.50 | 5.50 | 5.50 | 5.50 | 5.50 | 5.50 | 5.50 | 5.50 | 5.50 |
| 4 | 2.00 | 3.25 | 3.25 | 3.25 | 3.25 | 3.25 | 3.25 | 3.25 | 3.25 | 3.25 |
| 3 | 0.40 | 0.45 | 0.45 | 0.45 | 0.45 | 0.45 | 0.45 | 0.45 | 0.45 | 0.45 |
| 2 | 0.20 | 0.25 | 0.25 | 0.25 | 0.25 | 0.25 | 0.25 | 0.25 | 0.25 | 0.25 |
| 1 | 0.10 | 0.15 | 0.15 | 0.15 | 0.15 | 0.15 | 0.15 | 0.15 | 0.15 | 0.15 |
| 0 | 1.25 | 2.35 | 2.35 | 2.35 | 2.35 | 2.35 | 2.35 | 2.35 | 2.35 | 2.35 |

718 702 720 721 722 723 724 725 726 727 728

718 730 731 732 733 734 735 736 737 738 739

AWARD DIFFERENCE

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | | | | | | | | | |
| 7 | 100.00 | 165.00 | 186.67 | 197.50 | 204.00 | 208.33 | 211.43 | 213.75 | 215.56 | 217.00 |
| 6 | 12.00 | 21.25 | 24.33 | 25.88 | 26.80 | 27.42 | 27.86 | 28.19 | 28.44 | 28.85 |
| 5 | 4.00 | 4.75 | 5.00 | 5.13 | 5.20 | 5.25 | 5.29 | 5.31 | 5.33 | 5.35 |
| 4 | 2.00 | 2.63 | 2.83 | 2.94 | 3.00 | 3.04 | 3.07 | 3.09 | 3.11 | 3.13 |
| 3 | 0.40 | 0.43 | 0.43 | 0.44 | 0.44 | 0.44 | 0.44 | 0.44 | 0.44 | 0.45 |
| 2 | 0.20 | 0.23 | 0.23 | 0.24 | 0.24 | 0.24 | 0.24 | 0.24 | 0.24 | 0.25 |
| 1 | 0.10 | 0.13 | 0.13 | 0.14 | 0.14 | 0.14 | 0.14 | 0.14 | 0.14 | 0.15 |
| 0 | 1.25 | 1.80 | 1.98 | 2.08 | 2.13 | 2.17 | 2.19 | 2.21 | 2.23 | 2.24 |

722 703 740 741 742 743 744 745 746 747 748

724 750 751 752 753 754 755 756 757 758 759

PER WAGER AWARD

FIG. 7

WINNER TAKES ALL PAY SCHEDULE - NON-REGULAR FORM

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | JACKPOT | JACKPOT | JACKPOT | JACKPOT | JACKPOT | JACKPOT | JACKPOT | JACKPOT | JACKPOT |
| 7 | 100.00 | 200.00 | 300.00 | 400.00 | 500.00 | 600.00 | 700.00 | 800.00 | 1,000.00 | 1,230.00 |
| 6 | 12.00 | 24.00 | 36.00 | 48.00 | 60.00 | 72.00 | 84.00 | 114.50 | 145.00 | 175.50 |
| 5 | 4.00 | 8.00 | 12.00 | 16.00 | 20.00 | 24.00 | 29.50 | 35.00 | 40.50 | 46.00 |
| 4 | 2.00 | 4.00 | 6.00 | 8.00 | 10.00 | 13.25 | 16.50 | 19.75 | 23.00 | 26.25 |
| 3 | 0.40 | 0.80 | 1.20 | 1.60 | 2.05 | 2.50 | 2.95 | 3.40 | 3.85 | 4.30 |
| 2 | 0.20 | 0.40 | 0.60 | 0.85 | 1.10 | 1.35 | 1.60 | 1.85 | 2.10 | 2.35 |
| 1 | 0.10 | 0.20 | 0.35 | 0.50 | 0.65 | 0.80 | 0.95 | 1.10 | 1.25 | 1.40 |
| 0 | 1.25 | 3.60 | 5.95 | 8.30 | 10.65 | 13.00 | 15.35 | 17.70 | 20.05 | 22.40 |

810 801 812

AWARD AMOUNTS

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | | | | | | | | | |
| 7 | 100.00 | 100.00 | 100.00 | 100.00 | 100.00 | 100.00 | 100.00 | 100.00 | 200.00 | 230.00 |
| 6 | 12.00 | 12.00 | 12.00 | 12.00 | 12.00 | 12.00 | 12.00 | 30.50 | 30.50 | 30.50 |
| 5 | 4.00 | 4.00 | 4.00 | 4.00 | 4.00 | 4.00 | 5.50 | 5.50 | 5.50 | 5.50 |
| 4 | 2.00 | 2.00 | 2.00 | 2.00 | 2.00 | 3.25 | 3.25 | 3.25 | 3.25 | 3.25 |
| 3 | 0.40 | 0.40 | 0.40 | 0.40 | 0.45 | 0.45 | 0.45 | 0.45 | 0.45 | 0.45 |
| 2 | 0.20 | 0.20 | 0.20 | 0.25 | 0.25 | 0.25 | 0.25 | 0.25 | 0.25 | 0.25 |
| 1 | 0.10 | 0.10 | 0.15 | 0.15 | 0.15 | 0.15 | 0.15 | 0.15 | 0.15 | 0.15 |
| 0 | 1.25 | 2.35 | 2.35 | 2.35 | 2.35 | 2.35 | 2.35 | 2.35 | 2.35 | 2.35 |

818 802 820 821 822 823 824 825 826 827 828

818 830 831 832 833 834 835 836 837 838 839

AWARD DIFFERENCE

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | | | | | | | | | |
| 7 | 100.00 | 100.00 | 100.00 | 100.00 | 100.00 | 100.00 | 100.00 | 100.00 | 111.11 | 123.00 |
| 6 | 12.00 | 12.00 | 12.00 | 12.00 | 12.00 | 12.00 | 12.00 | 14.31 | 16.11 | 17.55 |
| 5 | 4.00 | 4.00 | 4.00 | 4.00 | 4.00 | 4.00 | 4.21 | 4.38 | 4.50 | 4.60 |
| 4 | 2.00 | 2.00 | 2.00 | 2.00 | 2.00 | 2.21 | 2.36 | 2.47 | 2.56 | 2.63 |
| 3 | 0.40 | 0.40 | 0.40 | 0.40 | 0.41 | 0.42 | 0.42 | 0.43 | 0.43 | 0.43 |
| 2 | 0.20 | 0.20 | 0.20 | 0.21 | 0.22 | 0.23 | 0.23 | 0.23 | 0.23 | 0.24 |
| 1 | 0.10 | 0.10 | 0.12 | 0.13 | 0.13 | 0.13 | 0.14 | 0.14 | 0.14 | 0.14 |
| 0 | 1.25 | 1.80 | 1.98 | 2.08 | 2.13 | 2.17 | 2.19 | 2.21 | 2.23 | 2.24 |

822 803 840 841 842 843 844 845 846 847 848

824 850 851 852 853 854 855 856 857 858 859

PER WAGER AWARD

FIG. 8

WINNER TAKES ALL PAY SCHEDULE - REGULAR FORM

BET SIZE

| MATCHES | 1 | 2 | 3 | 4 | 5 | 6 | 7 | 8 | 9 | 10 |
|---|---|---|---|---|---|---|---|---|---|---|
| 8 | JACKPOT | JACKPOT | JACKPOT | JACKPOT | JACKPOT | JACKPOT | JACKPOT | JACKPOT | JACKPOT | JACKPOT |
| 7 | 100.00 | 300.00 | 500.00 | 700.00 | 900.00 | 1,100.00 | 1,300.00 | 1,500.00 | 1,700.00 | 2,000.00 |
| 6 | 12.00 | 42.50 | 73.00 | 103.50 | 134.00 | 164.50 | 195.00 | 225.50 | 256.00 | 286.50 |
| 5 | 4.00 | 9.50 | 15.00 | 20.50 | 26.00 | 31.50 | 37.00 | 42.50 | 48.00 | 53.50 |
| 4 | 2.00 | 5.25 | 8.50 | 11.75 | 15.00 | 18.25 | 21.50 | 24.75 | 28.00 | 31.25 |
| 3 | 0.40 | 0.85 | 1.30 | 1.75 | 2.20 | 2.65 | 3.10 | 3.55 | 4.00 | 4.45 |
| 2 | 0.20 | 0.45 | 0.70 | 0.95 | 1.20 | 1.45 | 1.70 | 1.95 | 2.20 | 2.45 |
| 1 | 0.10 | 0.25 | 0.40 | 0.55 | 0.70 | 0.85 | 1.00 | 1.15 | 1.30 | 1.45 |
| 0 | 1.25 | 3.60 | 5.95 | 8.30 | 10.65 | 13.00 | 15.35 | 17.70 | 20.05 | 22.40 |

910 901 912

AWARD AMOUNTS

BET SIZE

| | MATCHES | 1 | 2 | 3 | 4 | 5 | 6 | 7 | 8 | 9 | 10 |
|---|---|---|---|---|---|---|---|---|---|---|---|
| 920 | 8 | JACKPOT | | | | | | | | | |
| 921 | 7 | 100.00 | 200.00 | 200.00 | 200.00 | 200.00 | 200.00 | 200.00 | 200.00 | 200.00 | 300.00 |
| 922 | 6 | 12.00 | 30.50 | 30.50 | 30.50 | 30.50 | 30.50 | 30.50 | 30.50 | 30.50 | 30.50 |
| 923 | 5 | 4.00 | 5.50 | 5.50 | 5.50 | 5.50 | 5.50 | 5.50 | 5.50 | 5.50 | 5.50 |
| 924 | 4 | 2.00 | 3.25 | 3.25 | 3.25 | 3.25 | 3.25 | 3.25 | 3.25 | 3.25 | 3.25 |
| 925 | 3 | 0.40 | 0.45 | 0.45 | 0.45 | 0.45 | 0.45 | 0.45 | 0.45 | 0.45 | 0.45 |
| 926 | 2 | 0.20 | 0.25 | 0.25 | 0.25 | 0.25 | 0.25 | 0.25 | 0.25 | 0.25 | 0.25 |
| 927 | 1 | 0.10 | 0.15 | 0.15 | 0.15 | 0.15 | 0.15 | 0.15 | 0.15 | 0.15 | 0.15 |
| 928 | 0 | 1.25 | 2.35 | 2.35 | 2.35 | 2.35 | 2.35 | 2.35 | 2.35 | 2.35 | 2.35 |
| | 918 | 930 | 931 | 932 | 933 | 934 | 935 | 936 | 937 | 938 | 939 |

916 902

AWARD DIFFERENCE

BET SIZE

| | MATCHES | 1 | 2 | 3 | 4 | 5 | 6 | 7 | 8 | 9 | 10 |
|---|---|---|---|---|---|---|---|---|---|---|---|
| 940 | 8 | JACKPOT | | | | | | | | | |
| 941 | 7 | 100.00 | 150.00 | 166.67 | 175.00 | 180.00 | 183.33 | 185.71 | 187.50 | 188.89 | 200.00 |
| 942 | 6 | 12.00 | 21.25 | 24.33 | 25.88 | 26.80 | 27.42 | 27.86 | 28.19 | 28.44 | 28.65 |
| 943 | 5 | 4.00 | 4.75 | 5.00 | 5.13 | 5.20 | 5.25 | 5.29 | 5.31 | 5.33 | 5.35 |
| 944 | 4 | 2.00 | 2.63 | 2.83 | 2.94 | 3.00 | 3.04 | 3.07 | 3.09 | 3.11 | 3.13 |
| 945 | 3 | 0.40 | 0.43 | 0.43 | 0.44 | 0.44 | 0.44 | 0.44 | 0.44 | 0.44 | 0.45 |
| 946 | 2 | 0.20 | 0.23 | 0.23 | 0.24 | 0.24 | 0.24 | 0.24 | 0.24 | 0.24 | 0.25 |
| 947 | 1 | 0.10 | 0.13 | 0.13 | 0.14 | 0.14 | 0.14 | 0.14 | 0.14 | 0.14 | 0.15 |
| 948 | 0 | 1.25 | 1.80 | 1.98 | 2.08 | 2.13 | 2.17 | 2.19 | 2.21 | 2.23 | 2.24 |
| | 924 | 950 | 951 | 952 | 953 | 954 | 955 | 956 | 957 | 958 | 959 |

922 903

PER WAGER AWARD

FIG. 9

GAMING DEVICE PROVIDING AN OPPORTUNITY TO RECEIVE AWARDS WHICH VARY WITH DIFFERENT NON-MAX BETS

CROSS REFERENCE TO RELATED APPLICATION

This application claims the benefit of provisional application No. 60/577,236 filed Jun. 4, 2004.

FIELD OF THE INVENTION

The present invention relates to gaming systems and devices and more particularly to methods and systems providing for a player to be eligible to win an "As Is" prize on his first wager or non-max wager on a multi-wager game.

BACKGROUND

Wagering on games of chance can be a form of entertainment and recreation, as well as a source of profit for establishments that provide the games (referred to in this specification as the casino). There are different types of games of chance, examples of which include and are not limited to craps, blackjack, roulette, baccarat, poker, keno, bingo, stud poker, video poker, and slot games. These games typically have pay schedules, also known as pay tables, which describe what award can be won based upon the wager size and game outcome. Furthermore, many types of games, like bingo, keno, video poker and slot games, to name a few, offer great latitude in pay schedule details.

The Expected Return To Player, or ERTP, of a game describes the long term expected player payback across all players. Another way of expressing this is the ratio of all expected player awards to all player wagers. For a game to be profitable for the casino, this ratio must average less than 100% over the long run. Actualized Return To Player, or ARTP for any given amount of play can vary from ERTP but the larger the set of games played, the closer the ARTP should be to the ERTP.

Certain games, like craps, bingo, keno and video poker, to name a few, have outcomes based upon known uniformly distributed play mechanism, such as randomly thrown dice or randomly drawn cards or numbered balls (either as physical devices or in computer modeled equivalents). These are referred to as "naked games." The expected outcome of such naked games can therefore be completely known to the player and based upon the visible pay schedule players can know the ERTP of such games.

Other games, such as slot games and scratcher-style games, do not have such publicly available game outcome methods. Unless the ERTP is actually stated, as is the case with some games offered online, the player cannot deduce the ERTP merely from the game's pay schedule. These are referred to as "cloaked games".

Every casino game can be considered to have a denomination defined by a minimum bet ("min bet") and a maximum bet ("max bet"). The denomination is the wagering unit. For a physical device which accepts coins or tokens, the denomination is often the smallest coin or token that the device will accept. Typically, the min bet for these devices is 1 unit of the denomination. For example, video poker and slot machines in U.S. casinos are usually designated to accept bets of specific denominations such as 5¢, 25¢, 50¢ and $1. A $5 slot machine or video poker machine, however, may accept $1 units but requires a minimum bet of $5 and all larger bets must be integer multiples of $5. Therefore the denomination for such a game is $5. Similarly, table based games, like Blackjack, allow $1 chips to be used to place bets and accept a bet of any multiple of $1 which is between the min bet limit (which is usually greater than $1) and the max bet limit.

Most casino games allow the player to play a specific game with a variety of bet sizes. An example is a slot game which can be played for one or two betting units. Another example with greater bet ranges includes table games which allow any whole dollar wager between $5 and $250, inclusively. Award values for winning outcomes are usually based on the award multiplier times the actual wager, except as discussed below. If a player places a $1 wager on a $1 slot game and obtains a winning outcome which pays 5 units, the player wins $5 ($1×5=$5). However, if the player wagers $2 on the winning payline, the player wins $10 ($2×5=$10) and so on. With such games, the per-wager award remains the same.

In addition to standard per-wager awards, some casino games also offer specific "As Is" awards which are typically indivisible and non-multiplicative such that they do not have a per-wager component. Primary examples include physical prizes such as a displayed motorcycle, car, boat or vacation, progressive jackpots which grow in size over time until won or special award amounts which are usually large amounts of money.

Some casino games allow the player to wager on different outcomes of the same game. For example, the game of craps allows for a myriad of different kinds of outcomes that the player can simultaneously wager upon. Likewise, slot games with multiple paylines allow the player to place separate wagers on different paylines.

Games which allow the player to wager on different outcomes often also allow the player to vary the bet size as well. An actual slot game which has these features is known as a multi-coin/multi-line ("MCML") slot game as exemplified by Williams Gaming's Reel 'Em In five reel slot games. With Reel 'Em In, the player chooses how many paylines (e.g., 1, 2, 3, 4 or 5) to wager on. The player may also decide how many betting units per payline to wager as defined by the game. In most cases, the game provides for a minimum of one betting unit per payline to a defined maximum betting units per payline. MCML slot games have proven quite successful in casinos. Conventional wisdom in the industry says there are a number of potential reasons for the popularity including:

High Hit Frequency whereby the player often gets some sort of award (though not necessarily larger than the original wager.);

Ability for one game to accommodate a range of player bet sizes. For example, a game with 9 paylines allowing up to 9 bet units per payline has a 1 to 81 bet range; and Ability to allow players to easily increase their bet size, either by playing more paylines for higher hit frequency or more per payline for higher volatility or both. This may help attract a player for low stakes and then ease the player into wagers larger than the player typically plays.

Casinos typically use a variety of methods to encourage players to wager as much money per play as possible. One way is to offer games with higher ERTP for certain sized denominations and/or minimum bets. For example, a roulette game with only one green space has a higher ERTP than a roulette game with two green spaces. A given casino may have both types of roulette games available, but only makes the higher ERTP one-space roulette game available to players who play at least $100 or more per play. Another example comprises video poker games offered at different denominations such that the pay schedule for the higher denomination machines offer higher per-wager awards for certain outcomes than are available on the lower denomination machines.

Casinos typically also offer cloaked games such that the ERTP is higher based on the size of the bet denomination. For a given type of slot game, such as IGT's Double Diamond, changes in ERTP may only be affected by changing the underlying outcome probabilities and not by changing the visible fixed pay schedule.

Another method casinos use to encourage higher wagers per play is to improve the ERTP and/or the prize opportunities based upon the actual wager size within a specific game at a specific denomination. This is in contrast to a pure multiplier game which pays the same award amount per wager regardless of wager size. An example of a pure multiplier game is Williams Gaming's Reel 'Em In five reel slot machine which pays the same per-wager award for a winning outcome regardless of the number of units bet on the payline which produces the winning outcome.

There are two major varieties of pay schedule design to encourage higher per-play betting: Sweeteners and Buy-A-Pays.

A sweetener means that a given outcome is paid at a higher per-wager award rate at a higher wager level. This normally translates into a relatively higher award and ERTP only for max bet wager play. For example, the most popular video poker games typically have a sweetener for the Royal Flush outcome when the max bet is played. Specifically, a Royal Flush outcome pays 250 times the wager if the player has not played a max bet wager. For example, if the player places a $2 wager in a $1 denominated Jacks or Better video poker game which results in a Royal Flush outcome, he receives $500 (250×$2=$500). However, with a typical video poker game, with a five unit max bet, a Royal Flush outcome pays 4000 units which is 800 times the wager instead of the unsweetened 250 multiplier for non-max wagers. For most Jacks or Better video poker games, this max bet sweetener increases the ERTP by 1.2% relative to the ERTP for non-max bet play.

Similarly, most three reel slot games offer a sweetener for the top award or for the top two awards. Since most legitimate gaming jurisdictions do not allow the game outcome to vary based upon how much a player wagers on a multi-wager game, players realize that the max bet sweetener on a cloaked game, like a slot game, does increase the ERTP even though the player may not be able to directly determine the actual respective non-max bet and max bet ERTPs.

Some casino games offer "As Is" awards, such as a progressive jackpot or a physical prize, as sweeteners for max bet play. This may be in lieu of, or may be in addition to, standard awards. For example, on a slot game the top-most outcome pays a specific per-bet unit award for non-max bet but awards the "As Is" prize for a top-most outcome won on a max bet proposition.

Another type of pay schedule design to encourage higher wagering is a Buy-A-Pay structure. This makes available certain winning outcomes after a threshold wager. For example, the pay schedule for Alliance/Bally Gaming's Blazing 7's slot game pays nothing for obtaining three 7 symbols on the payline unless a wager of at least two units is place. The first wagered unit only provides awards for outcomes having BAR symbols or BLANK symbols. The second wager unit provides awards for outcomes having aligned 7 symbols but does not increase the award size for outcomes having BAR symbols or BLANK symbols.

There are pay schedules which combine both multiplier Sweeteners and Buy-A-Pay. Diamond Game Enterprise's Roman Reels game, for example, offers a sweetener for the top award for three coin max unit bet, and activates some bonus mechanisms not offered for lower bet amounts while not increasing the standard award related to two or three wagered coins.

Unfortunately, the above techniques are less effective for MCML slot games. The dynamics do not mesh well with the advantages of having a wide betting range. For example, because of the large bet range of most MCML games, making an "As Is" prize available for max bet play makes the game too expensive for players who cannot afford to play at the max bet level or do not want to start playing at such a level. Since most players can recognize that there is a higher ERTP for max bet play, they may be reluctant to play this game in their standard non-max bet fashion since they may correctly feel they are getting a bad deal relative to max bet players.

Similarly, we are not aware of any existing multi-bet game which makes an "As Is" prize available for the first bet unit of a multi-bet game. A game which offers an "As Is" prize for a bet threshold less than max bet creates a disincentive for any wager above the threshold since the ERTP for the game would drop beyond the threshold. For example, if a player can win a car on a certain outcome with a single bet unit wager, and would not win a prize of at least two cars or its equivalent for a two bet unit wager, the ERTP for two bet unit play is clearly inferior relative to the ERTP for one bet unit.

Thus, there is the need for a method of offering an "As Is" prize related to a non-max bet while maintaining or increasing ERTP for larger bets.

SUMMARY OF THE INVENTION

Accordingly, the embodiments of the present invention relate to an improved device and method which provides the ability to offer a multi-bet game of chance whereby an "As Is" prize is offered for a non-max bet while maintaining or increasing ERTP for larger bets.

This is accomplished by offering a unique pay schedule which sweetens one or more of the regular awards beyond the threshold required for the player to be eligible for the "As Is" prize. For example, a pay schedule can be defined which offers awards for each possible outcome of an eight spot keno game including zero to all eight spots matching one of twenty drawn balls from a pool of eighty numbered balls such that a first unit bet has a corresponding "As Is" prize for matching eight out of eight numbers and standard awards for all other outcomes. Furthermore, wagers larger than one unit win the very same "As Is" prize but provide enhanced standard award values based on the increased bet unit. This can cause, for example, all of the outcomes, except for the eight out of eight outcome, to more than double in size for doubling the bet unit from one bet unit to two bet units.

Whether the embodiment of the present invention are applied to a naked game or a cloaked game, the player should be able to easily notice the nonlinear jump in the sweetened awards which should help encourage larger wagers to be placed on the game. Additionally, while the embodiments of the present invention allow a game to be designed that maintains or increases ERTP with increased bet units, this is not the only application. It may be sufficient for the player to notice the sweetening to encourage larger bets without the player actually performing an ERTP calculation himself or reviewing ERTP information made available elsewhere. This is especially true for a cloaked game where the player is typically unable to ascertain the actual ERTP for any wager size. Also, when the "As Is" prize is a progressive jackpot, an exceptionally large overdue jackpot can sway the immediate ERTP to a maximum value for the first bet unit. Additionally, with an irregular form pay schedule (described below), it would be possible for the ERTP to irregularly vary with each bet unit.

The embodiments of the present invention include a game whose pay schedule makes an "As Is" prize available on a bet threshold which is neither one bet unit nor max bet unit. For example, a MCML slot game can be defined which makes an "As Is" prize available for a certain outcome in response to the player wagering at least one bet unit on each payline. If the player wagers more than one bet unit per payline, one or more of the other outcomes can have sweetened awards which pay out a larger per unit bet multiplier than for single bet unit play. This game definition might or might not require that the threshold bet for all paylines be met before the sweetening is activated. Another example is a game which makes an "As Is" prize available on the second bet unit, but provides one or more regular award sweeteners for bet sizes larger than two bet units.

Another advantage of the embodiments of the present invention is that it allows a player to control game volatility. A player wishing to maximize his or her chance at winning an "As Is" prize can elect to play only one bet unit. Alternately, a player wishing to reduce the volatility and increase the relative payback of the lower awards can elect to wager more per play.

If there is more than one additional bet level beyond the bet threshold which activates the "As Is" prize, there are several approaches available for sweetening awards with higher bets. A simple approach, referred to as "regular form" defines a new base award multiplier for the additional bet units. The award amount can be expressed with the following formula:

If TotalBet<=ThresholdBet:

Award=BaseAwardMultiplier×TotalBet

Otherwise:

Award=(BaseAwardMultiplier×ThresholdBet)+(SweetenedAwardMultiplier×(Total Bet−ThresholdBet))

Another approach crafts different sweeteners per bet unit beyond threshold in a non-regular fashion. This includes different award types receiving different sweetening amounts at different bet levels.

The embodiments of the present invention can be applied to games with a pay schedule where all of the non-"As Is" prize outcomes are sweetened beyond the threshold bet or to games where only certain non-"As Is" prize outcomes are sweetened beyond the threshold bet.

The embodiments of the present invention can be applied to a game which contains multiple "As Is" prizes and/or has multiple outcomes which award an "As Is" prize. In fact, another innovative approach to allowing "As Is" prizes for non-max bets is to offer two or more "As Is" prizes. For example, a game with two bet units can offer one "As Is" Prize (e.g., motorcycle) for the first bet unit and an additional "As Is" prize (e.g., car) for the second bet unit.

The embodiments of the present invention may also be applied to any multi-bet game of chance regardless of implementation including live games, with or without a table, mechanical devices, electromechanical devices, video games, computer games and/or Internet-based games.

BRIEF DESCRIPTION OF THE DRAWINGS

These and other features and advantages will become better appreciated as the same becomes better understood with reference to the description wherein:

FIG. 3 is a display of a video poker straight multiplier pay schedule with max bet sweetener;

FIG. 5 is an expanded version of a Blazing 7's slot game with the buy-a-pay pay schedule;

FIG. 7 is an alternate display of a keno game with a pay schedule demonstrating regular form or structure;

FIG. 8 is a display of a keno game with a non-regular pay schedule (e.g., a pay schedule demonstrating non-regular form);

FIG. 9 is a display of an alternate version of a keno game with a mostly regular pay schedule plus an additional sweetener for max bet.

DESCRIPTION

Figure 1:
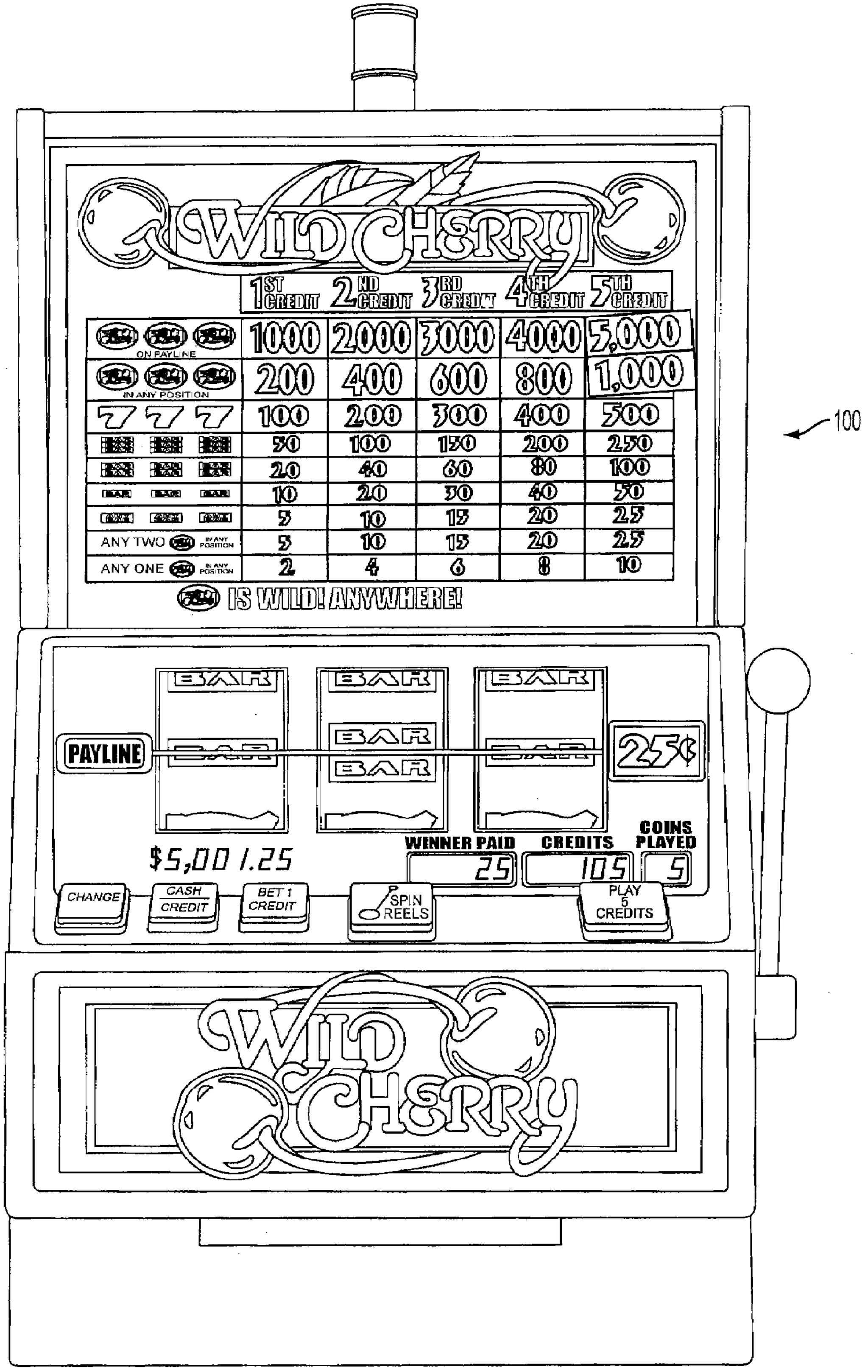
FIG. 1 is a display of a slot game with a standard pure multiplier pay schedule (e.g., a straight multiplier pay schedule)

Turning to the drawings, FIG. 1 shows a representation of a slot game 100 with a pure straight multiplier pay schedule. The per-wager award amounts do not vary with the actual number of bet units wagered. This game allows the player to wager between one bet unit and five bet units, inclusively. For every outcome, a five unit wager always results in five times what the same outcome would pay for a one unit wager.

Figure 2:
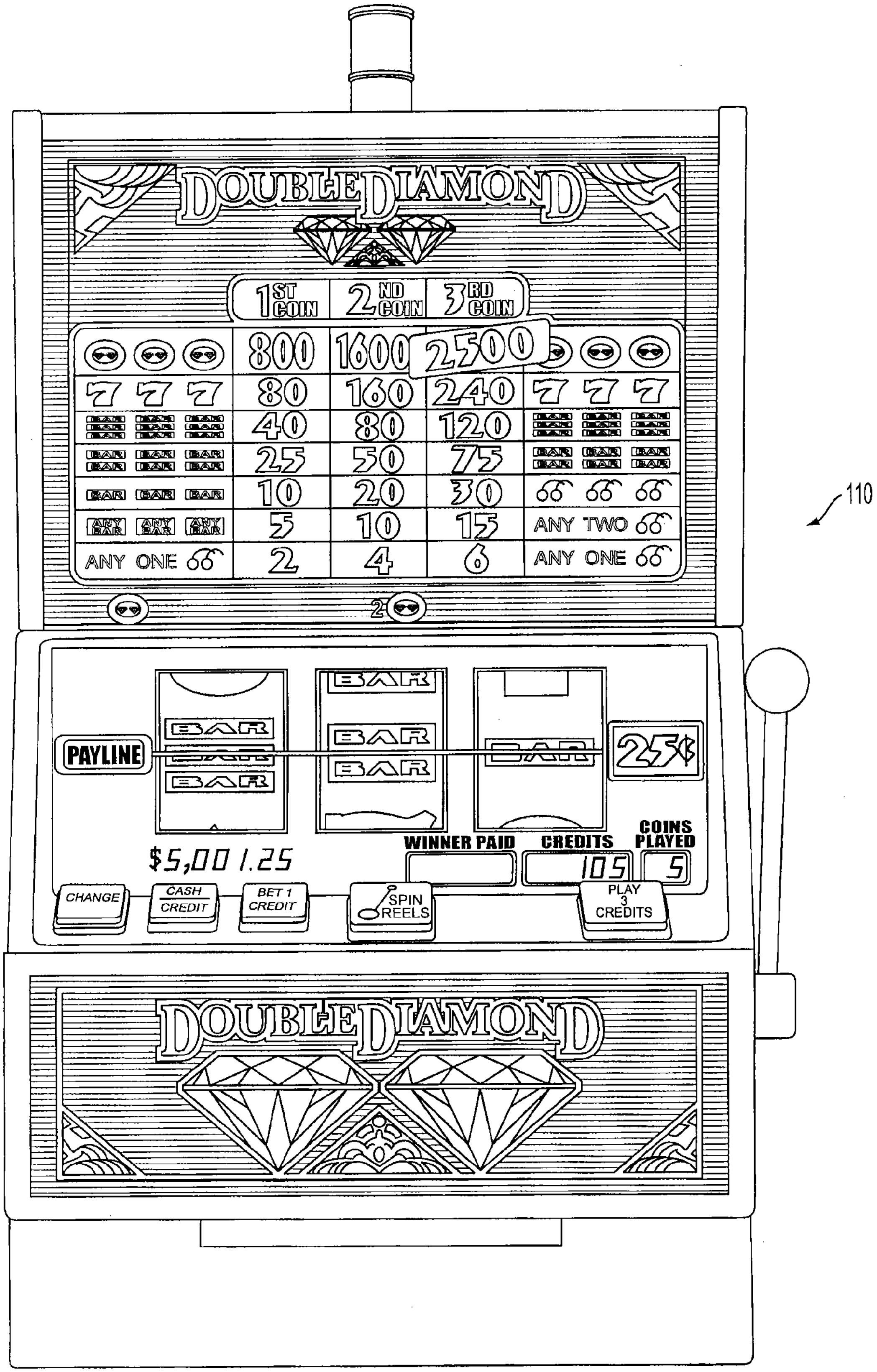
FIG. 2 is a display of a slot game with a straight multiplier pay schedule with sweetener (e.g., a max bet sweetener pay schedule)

FIG. 2 shows a representation of a slot game 110 with a sweetened pay schedule which sweetens the top award for max bet play. Specifically, while the top outcome of three Double Diamond symbols on the payline produces an award of 800 units for a one unit bet, this same outcome produces an award of 2500 for a three unit bet which is larger than three times the one unit bet award (i.e., 3×800=2400.)

FIG. 3 shows a representation of a traditional Jacks or Better video game 120 sweetened pay table having a sweetened top award for max bet play. Specifically, while the top outcome of a Royal Flush produces an award of 250 units for a one unit bet, this same outcome produces an award of 4000 for a five unit bet which is larger than five times the one unit bet award (i.e., 5×250=1250.)

Figure 4:
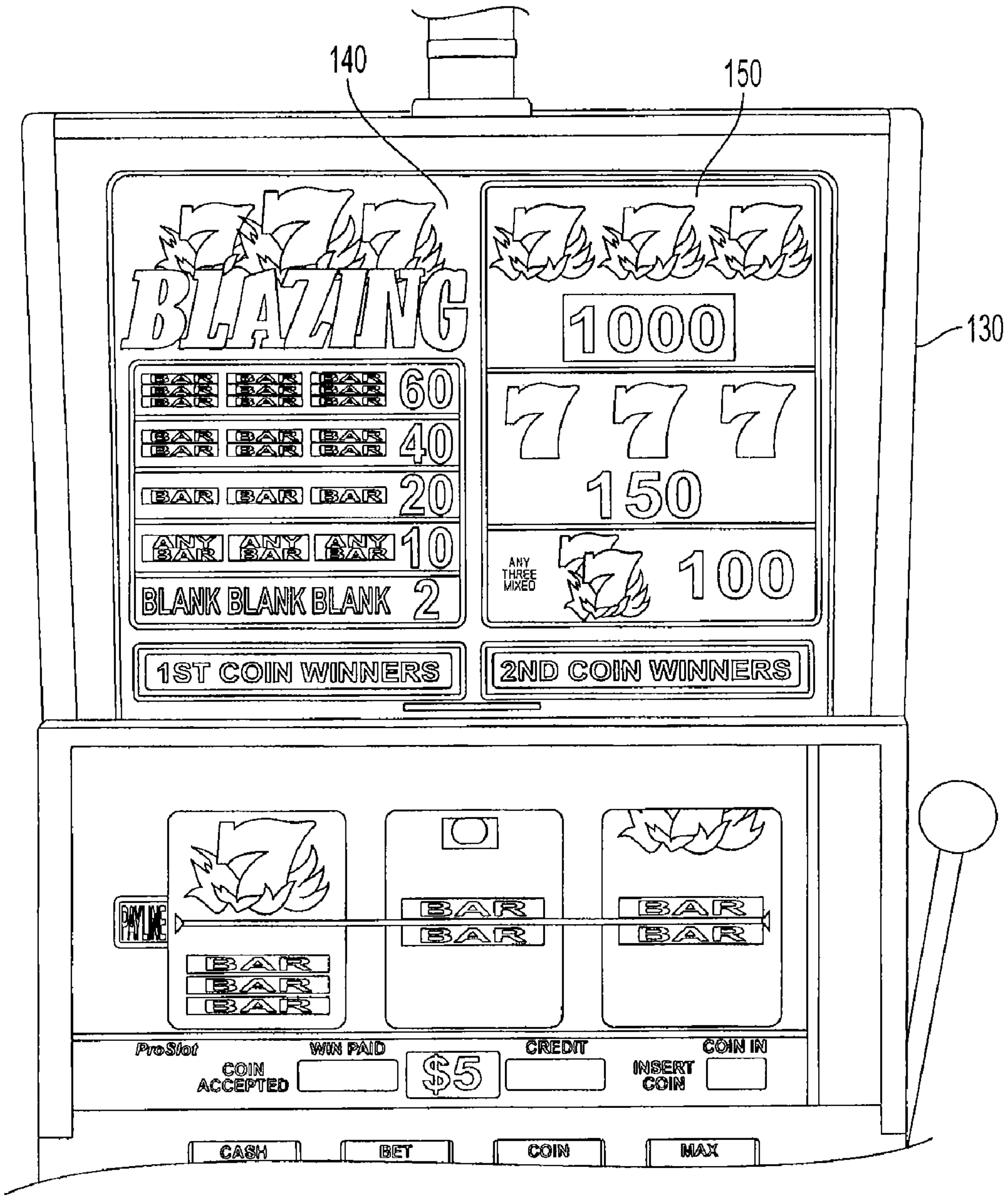
FIG. 4 is a display of a Blazing 7's slot game with a buy-a-pay pay schedule.

FIG. 4 shows a representation of a slot game 130 with a Buy-A-Pay pay schedule. The first bet unit 140 activates awards for matching BLANK symbols and for matching BAR symbols on the payline. However, with only one bet unit wagered, an outcome consisting of matching 7 symbols leads to no award. If the player wagers two bet units 150, not only does he receive the same exact awards for matching BLANK symbol outcomes or matching BAR symbols outcomes as he would have received for a single unit bet, but he now activates his opportunity to win awards for matching 7 symbol outcomes.

FIG. 5 shows an expanded version of the game 140 displayed in FIG. 4 which displays the actual award amount for each outcome at each bet unit level. This clearly shows that matching 7 symbol outcomes 510 pay nothing for 1 unit wagers 502 and that matching BLANK symbol outcomes and matching BAR symbol outcomes pay the same award 512, 514 regardless of whether 1 bet unit 502 or 2 bet units 504 were staked.

Figure 6:
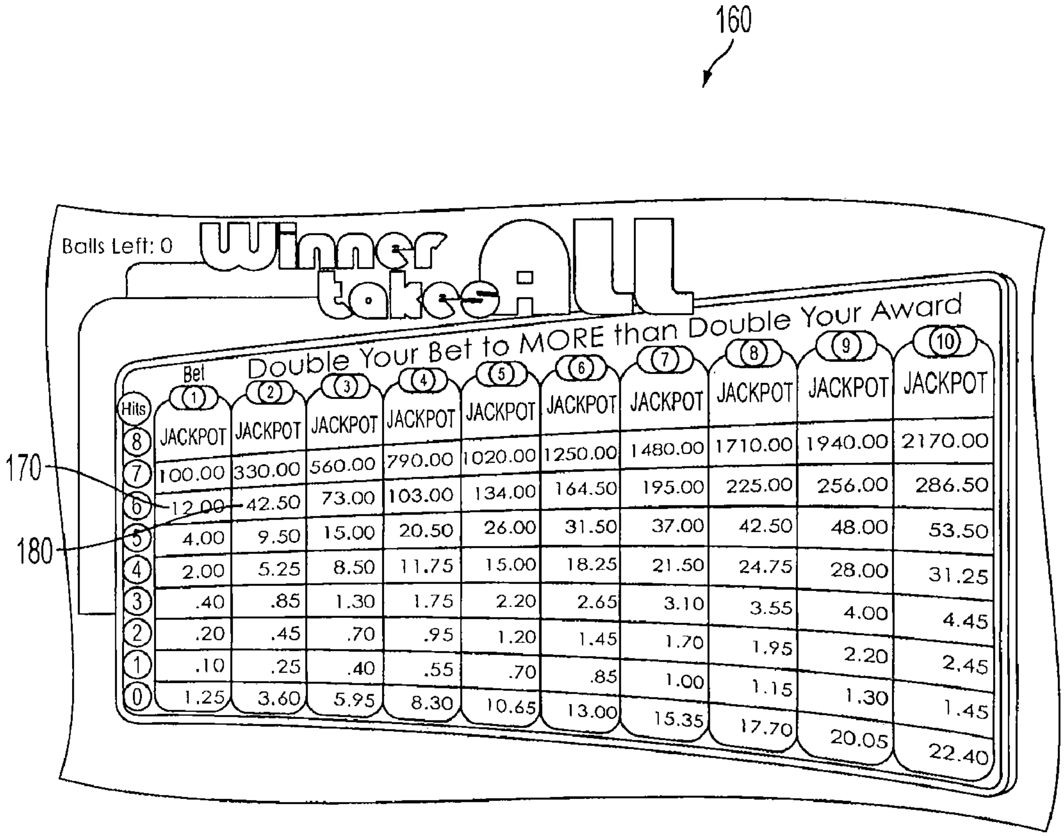
FIG. 6 is a display of a keno game with a pay schedule, the keno game demonstrating an innovative pay schedule.

FIG. 6 shows a representation of a keno game 160 pay schedule of an embodiment of the present invention. It is played like a standard keno game where the player selects eight of eighty numbers and awards are based on how many of these numbers match the numbers on twenty numbered balls drawn from a pool of balls numbered 1 through 80, inclusively. If all eight of the player's balls are matched by numbers on the drawn balls, the player wins the award labeled "Jackpot" which is an "As Is" prize such as a progressive jackpot, an especially large monetary prize or a physical prize based on the game design. Alternatively, if the player receives an award outcome other than an eight match outcome, he is paid according the type of outcome and wager amount which follows a non-linear pattern. For example, a six match outcome on one bet unit 170 pays 12 for 1 and a six match outcome on two units 180 pays 42.50 for 1 which corresponds to much more than twice the one unit bet award (i.e., 2×12.00=24 for 1).

FIG. 7 shows an alternative pay schedule from FIG. 6 which reflects some additional information about the pay schedule. Just like FIG. 6, the top table 701 shows the awards based upon the bet unit wagers 710 and the outcomes 712. The next table 702 shows the difference in award size for each bet unit. The top-most outcome 720, being an "As Is" prize, pays the same for all matches 721-728 regardless of the number of bet units wagered 716 so the difference after the first bet unit is 0. For the regular award, the first column 730 shows the base award amount for the first bet unit. The second column 731 shows the additional award from the second bet unit which is higher than every corresponding position in the first column for all of the award values. All of the subsequent columns 732-739 have the same values as the second column 731, which makes this section a regular form pay schedule. Specifically, this section is a regular form pay schedule because the award difference is the same for wagers larger than the threshold bet amount which qualify for an "As Is" prize. The last table 703 shows the award per-bet unit for each bet unit 722 comprising columns 750-759, and each outcome 724, comprising matches 740-748. It is easy to notice that unlike a pure straight multiplier pay schedule, the per-bet unit award for any given outcome tends to get larger in relation to the bet size itself.

FIG. 8 shows a different sample pay schedule of the present invention which is of non-regular form. The second table 802, which corresponds to table 801 having bet units 810 and matches 812, shows that not all outcomes are sweetened after the threshold unit bet. Award differences correspond to columns 830-839 and matches correspond to rows 820-828. For a two bet unit wager 831, only the outcome 828 for zero matches is sweetened. For a three bet unit-wager 832, only the outcome 827 for a one match outcome is sweetened. In general, the award differences for the second through tenth columns 831-839 vary past the threshold bet unit size which qualifies the player for an "As Is" prize. The embodiments of the present invention do not require that all standard awards be sweetened at some point in the pay schedule, just that one or more is sweetened. Table 803 shows the per wager award 850-859 for each bet size 822 and corresponding matches 840-848.

FIG. 9 shows a variation of the pay schedule from FIG. 7 which is almost a regular form insofar as it is the same as the pay schedule in FIG. 7 except that the top most standard award for a seven match outcome 921 is sweetened for a max unit bet 939. Table 901 shows bet sizes 901 and matches 912. Table 902 shows award differences, comprising columns 930-939, for each bet size 916 and corresponding matches 918, comprising rows 920-928. Table 903 shows per wager awards 950-959 for each bet size 922 and corresponding matches 840-848.

Figure 10:
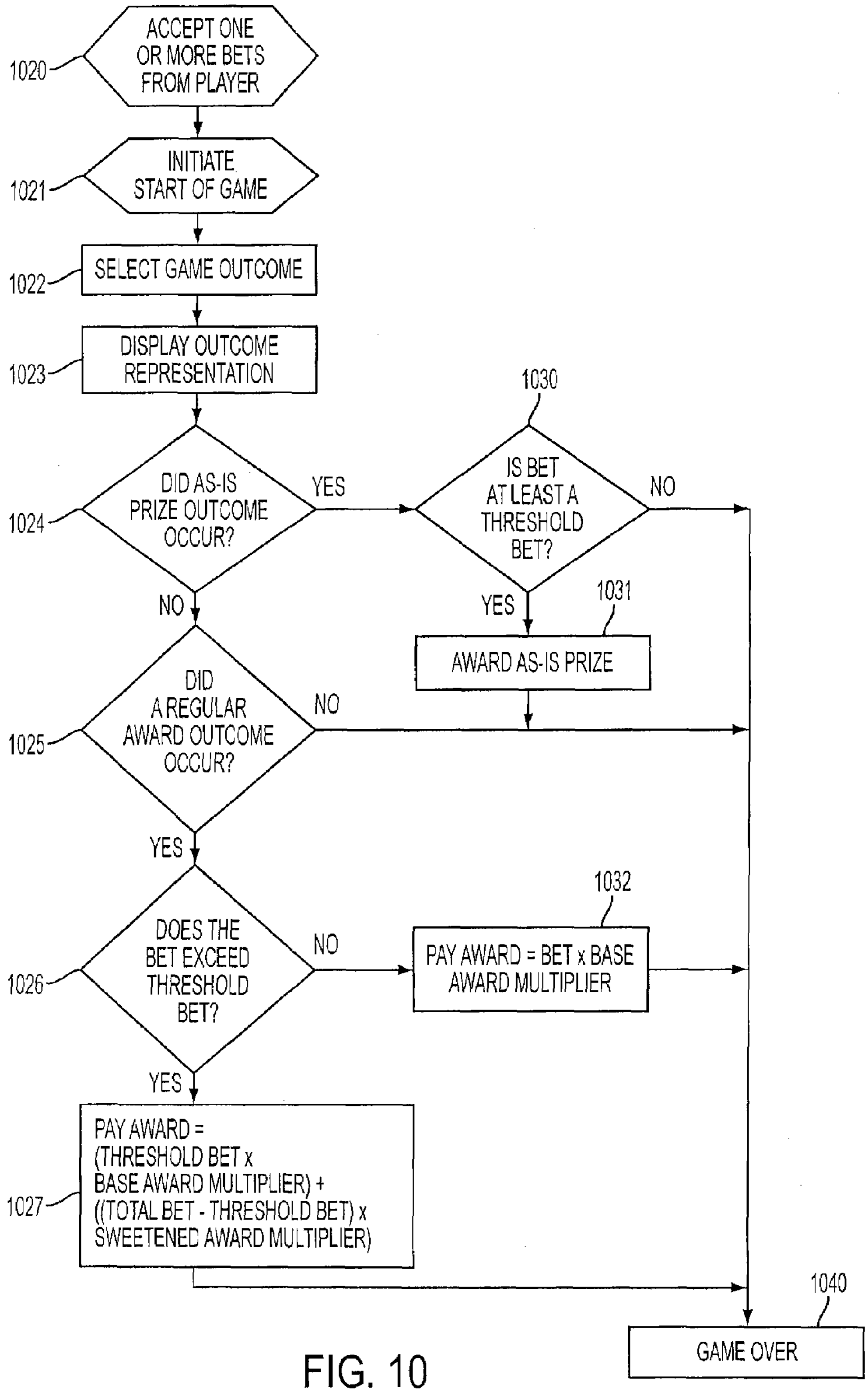
FIG. 10 is a block diagram of one embodiment of the present invention applied to a regular form pay schedule.

FIG. 10 shows a block diagram for one embodiment of a game device or game process relying upon the embodiments of the present invention. The game accepts bets from the player 1020, starts the game 1021 and determines an outcome 1022, which can be based on a pseudo random number generator, the selection of the next outcome from a predetermined fixed outcome series or by randomly selecting outcomes from a predefined pool of outcomes. The game outcome is displayed 1023 and the next steps determine whether or not the player is to receive an award and if so, which award. If the outcome is one which can award an "As Is" prize 1024, the player's wager is examined 1030. If the player wagered at least the eligible amount award for an "As Is" prize, award the "As Is" prize 1031 and end the game 1040, else end the game 1040 with no award. If the outcome is one which results in a standard award 1025, the award amounts can be calculated based upon the size of the bet 1026. A bet less than or equal to threshold bet is awarded at the base amount 1032 while a bet in excess of the threshold bet is awarded based upon a base award multiplier amount for the portion of the bet up to the threshold amount and at a sweetened award multiplier amount for the remainder of the bet 1027.

It should be noted that the block diagram of FIG. 10 is meant to demonstrate the nature of a regular form embodiment of the present invention. In terms of actual process or device implementation, it is possible to simply look up the award amount based upon the outcome and the bet amount, using a pay schedule such as samples shown in FIGS. 7-9. However, the same pay calculations shown in FIG. 10 can be used to create the values in such a pay schedule.

The block diagram in FIG. 10 is for a single proposition bet, such as a keno game or a single payline slot game. The embodiments of the present invention can also be applied to a multiple proposition game, such as a multi-coin multi-line slot games whereby a similar outcome analysis as depicted in FIG. 10 from steps 1024 through the end are applied for each payline or proposition.

I claim:

1. A method for operating a wagering game comprising:

(a) receiving a bet at any one of a plurality of different bet amounts for a play of the wagering game, the received bet satisfying a condition which requires the bet amount to be an amount less than a maximum bet amount and equal to or greater than a threshold bet amount;

(b) in response to the received bet satisfying the condition, providing an opportunity to obtain a first award and a second award as a result of the play of the wagering game, the opportunity being available for any bet amount which satisfies the condition:

(i) the first award being determinable based on:

(x) a first factor applied to the bet amount of the received bet if said bet amount is equal to a first or second one of the bet amounts, the second bet amount being higher than the first bet amount, and (y) a second, different factor applied to the bet amount of the received bet if said bet amount is equal to a third one of the bet amounts, the third bet amount being higher than the second bet amount, the second factor being greater than the first factor;

(ii) the second award having a maximum value available for the play of the wagering game;

(c) displaying at least one image associated with the opportunity; and (d) indicating the determined first or second award, if any.

2. The method of claim 1 including causing the second award to include an "As Is" award.

3. The method of claim 1 including establishing the threshold bet amount as a minimum bet amount.

4. The method of claim 1 which includes providing the first and second factors such that said first and second factors correspond to a nonlinear award progression.

5. The method of claim 1 which includes providing an expected payout rate of return for the wagering game, the expected payout rate of return being discoverable through disclosed information, the disclosed information being selected from the group consisting of: (a) publicly available information relating to the wagering game; (b) information obtainable by viewing the wagering game; and (c) information displayable in association with the wagering game.

6. The method of claim 1 which includes providing an expected payout rate of return for the wagering game, the expected payout rate of return being discoverable through information, at least part of the information being publicly unavailable.

7. The method of claim 2 which includes selecting the "As Is" award from the group consisting of a static monetary amount, a progressive jackpot and tangible personal property.

8. A gaming device comprising:
- at least one display device;
- at least one input device;
- at least one processor; and
- at least one memory device which stores a plurality of instructions, which, when executed by the at least one processor, cause the at least one processor to operate with the at least one display device and the at least one input device to:
  - (a) receive a bet for a play of a game, the received bet satisfying a condition which requires the bet amount to be an amount less than a maximum bet amount and an amount equal to or greater than a threshold bet amount;
  - (b) start a play of the game;
  - (c) in response to the received bet satisfying the condition, provide an opportunity to obtain a first award and a second award as a result of the play of the wagering game, the opportunity being available for any bet amount which satisfies the condition:
    - (i)the first award being determinable based on:
      - (x) a first factor applied to the bet amount of the received bet if said bet amount is equal to a first or second one of the bet amounts, the second bet amount being higher than the first bet amount, and
      - (y) a second, different factor applied to the bet amount of the received bet if said bet amount is equal to a third one of the bet amounts, the third bet amount being higher than the second bet amount, the second factor being greater than the first factor; and
    - (ii) the second award having a maximum value available for the play of the wagering game;
  - (d) display an image associated with the opportunity; and
  - (e) indicate the determined first or second award, if any.

9. The gaming device of claim 8 wherein the threshold bet amount is equal to a minimum bet amount.

10. The gaming device of claim 8 wherein the first and second factors correspond to a nonlinear award progression.

11. The gaming device of claim 8 wherein the game has an expected payout rate of return, the expected payout rate of return being discoverable through disclosed information, the disclosed information being selected from the group consisting of: (a) publicly available information relating to the wagering game; (b) information obtainable by viewing the wagering game; and (c) information displayable in association with the wagering game.

12. The gaming device of claim 8 wherein the game has an expected payout rate of return, the expected payout rate of return being discoverable through information, at least part of the information being publicly unavailable.

13. The gaming device of claim 8 wherein the second award includes at least one "As Is" award, the "As Is" award being selected from the group consisting of a static monetary amount, a progressive jackpot and tangible personal property.

14. A method for operating a gaming device, the method comprising:
- (a) receiving a bet for a play of a game, the received bet satisfying one of a plurality of conditions, the conditions including:
  - (i) a first condition which requires the bet to be equal to one of a plurality of different bet levels, each one of the bet levels being less than a maximum bet level, the bet levels including:
    - (x) a first bet level;
    - (y) a second bet level which is greater than the first bet level; and
    - (z) a third bet level which is greater than the second bet level; and
  - (ii) a second condition which requires the bet to be equal to the maximum bet level;
- (b) starting a play of a game;
- (c) in response to the received bet satisfying the first condition, providing an opportunity to obtain: (i) one of a plurality of awards, and (ii) a maximum award as a result of the play of the game, the opportunity being provided regardless of whether the bet level of the received bet is equal to the first, second, or third bet level:
  - (x) the plurality of awards including:
    - (1) a first one of the awards which is available if the bet level of the received bet is equal to the first bet level, the first award having an amount which depends upon the first bet level;
    - (2) a second one of the awards which is available if the bet level of the received bet is equal to the second bet level, the second award having an amount which depends upon the second bet level, the second award being greater than the first award; and
    - (3) a third one of the awards which is available if the bet level of the received bet is equal to the third bet level, the third award having an amount which depends upon the third bet level, the third award being greater than the second award, the first, second and third awards corresponding to the first, second and third bet levels so as to define a nonlinear award progression; and
  - (y) the maximum award being a maximum prize value available for the play of the game;
- (d) in response to the received bet satisfying the second condition, providing an opportunity to obtain the maximum award as a result of the play of the game; and
- (e) indicating any one of the awards obtained.

15. The method of claim 14 which includes providing the maximum award such that said maximum award has an amount which is greater than the amounts of the first, second, and third awards.

16. The method of claim 14 which includes determining the first award or the second award based on a mathematical operation applied to the bet amount of the received bet if said bet amount is equal to the first bet level or second bet level, and determining the third award based on a different mathematical operation applied to the bet amount of the received bet if said bet amount is the third bet level.

17. The method of claim 16 which includes providing an average expected return for the game which increases based on the non-linear award progression.

18. The method of claim 14 which includes selecting the maximum award from the group consisting of a static monetary amount, a progressive jackpot and tangible personal property.

19. The method of claim 14 which includes providing an average expected return for the game, the average expected return being discoverable through disclosed information, the disclosed information being selected from the group consisting of: (a) publicly available information relating to the game; (b) information obtainable by viewing the game; and (c) information displayable in association with the game.

20. The method of claim 14 which includes providing an average expected return for the game, the average expected return being discoverable through information which is, at least in part, publicly unavailable.

21. The method of claim 1 which includes: (a) specifying a first ratio of the first award to the first bet amount if the bet amount of the received bet is equal to the first bet amount; (b) specifying a second ratio of the first award to the second bet amount if the bet amount of the received bet is equal to the second bet amount, the second ratio being different from the first ratio; and (c) specifying a third ratio of the first award to the third bet amount if the bet amount of the received bet is equal to the third bet amount, the third ratio being different from the second ratio.

22. The method of claim 21 which includes specifying: (a) the first ratio such that the first ratio is proportional to the second ratio, and (b) the second ratio such that the second ratio is non-proportional to the third ratio.

23. The gaming device of claim 8 which includes data corresponding to: (a) a first ratio of the first award to the first bet amount if the bet amount of the received bet is equal to the first bet amount; (b) a second ratio of the first award to the second bet amount if the bet amount of the received bet is equal to the second bet amount, the second ratio being different from the first ratio; and (c) a third ratio of the first award to the third bet amount if the bet amount of the received bet is equal to the third bet amount, the third ratio being different from the second ratio.

24. The gaming device of claim 23 wherein: (a) the first ratio is proportional to the second ratio; and (b) the second ratio is non-proportional to the third ratio.

25. A gaming system comprising:

at least one display device;

at least one input device;

at least one processor; and at least one memory device which stores a plurality of instructions, which, when executed by the at least one processor, cause the at least one processor to operate with the at least one display device and the at least one input device to:

(a) receive a bet a play of a game, the received bet satisfying one of a plurality of conditions, the conditions including:

(i) a first condition which requires the bet to be equal to one of a plurality of bet levels which are less than a maximum bet level, the bet levels including:

(x) a first bet level;

(y) a second bet level which is greater than the first bet level; and (z) a third bet level which is greater than the second bet level;

(ii) a second condition which requires the bet to be equal to the maximum bet level;

(b) start a play of the game;

(c) in response to the received bet satisfying the first condition, provide an opportunity to obtain: (i) one of a plurality of awards, and (ii) a maximum award as a result of the play of the game, the opportunity being provided regardless of whether the bet level of the received bet is equal to the first, second, or third bet level:

(x) the plurality of awards including:

(1) a first award which is available if the bet level of the received bet is equal to the first bet level, the first award having an amount which depends upon the first bet level;

(2)a second award which is available if the bet level of the received bet is equal to the second bet level, the second award having an amount which depends upon the second bet level, the second award being greater than the first award;

(3) a third award which is available if the bet level of the received bet is equal to the third bet level, the third award having an amount which depends upon the third bet level the third award being greater than the second award, the first, second and third awards corresponding to the first, second and third bet levels so as to define a non-linear award progression; and (y) the maximum award being a maximum prize value available for the play of the game;

(d) in response to the received bet satisfying the second condition, providing an opportunity to obtain the maximum award as a result of the play of the game; and (e) indicate any one of the awards obtained.

26. The gaming system of claim 25, wherein the game has an expected payout rate of return, the expected payout rate of return being discoverable through disclosed information, the disclosed information being selected from the group consisting of: (a) publicly available information relating to the game; (b) information obtainable by viewing the game; and (c) information displayable in association with the game.

27. The gaming system of claim 25, wherein each one of the bet levels is equal to or greater than a minimum bet level.

28. The gaming system of claim 25, wherein the maximum award includes at least one "As Is" award.

29. The gaming system of claim 28, wherein the "As Is" award includes an award selected from the group consisting of a static monetary amount, a progressive jackpot, and tangible personal property.

30. A gaming system comprising:

at least one display device;

at least one input device;

at least one processor; and at least one memory device which stores a plurality of instructions, which, when executed by the at least one processor, cause the at least one processor to operate with the at least one display device and the at least one input device to:

(a) receive a bet for a play of a game, the received bet satisfying a bet condition, the bet condition requiring the bet to be equal to one of a plurality of bet levels which are less than a maximum bet level, the bet levels including:

(x) a first bet level;

(y) a second bet level which is greater than the first bet level; and (z) a third bet level which is greater than the second bet level;

(b) start the play of the game; and (c) in response to the received bet satisfying the bet condition, provide an opportunity to satisfy a first winning condition and a second winning condition as a result of the play of the game, the first and second winning conditions being satisfiable for any one of the bet levels;

(i) in response to the first winning condition being satisfied:

(x) determine a first award which is available if the bet level of the received bet is equal to the first bet level;

(y) determine a second award which is available if the bet level of the received bet is equal to the second bet level, the second award being greater than the first award; and (z) determine a third award which is available if the bet level of the received bet is equal to the third bet level, the third award being greater than the second award, the first, second and third awards corresponding to the first, second and third bet levels so as to define a non-linear award progression; and (ii) in response to the second winning condition being satisfied, indicate a maximum award which is available for the play of the game, the game being associated with an average expected payback percentage which remains substantially unchanged regardless of whether the received bet has the first, second or third bet level.

31. The gaming system of claim 30, which includes: (a) a second bet condition which requires the received bet to be equal to the maximum bet level, and (b) at least one instruction, which when executed by the at least one processor, causes the at least one processor, in response to the received bet satisfying the second bet condition, to provide another opportunity to satisfy the second winning condition.

32. The gaming system of claim 30, wherein the maximum award includes an "As Is" award selected from the group consisting of a static monetary amount, a progressive jackpot and tangible personal property.

33. The gaming system of claim 30, wherein each one of the bet levels is equal to or greater than a minimum bet level.

34. The gaming system of claim 30, wherein: the first and second winning conditions remain simultaneously available throughout the play of the game regardless of whether the received bet has the first, second or third bet level.

35. A gaming system comprising:

at least one display device;

at least one input device;

at least one processor; and at least one memory device which stores a plurality of instructions, which, when executed by the at least one processor, cause the at least one processor to operate with the at least one display device and the at least one input device to:

(a) receive a bet for a play of a game, the received bet satisfying one of a plurality of conditions, the conditions including:

(i) a first condition which requires the bet to be equal to one of a plurality of bet levels which are less than a maximum bet level, the bet levels including:

(x) a first bet level;

(y) a second bet level which is greater than the first bet level; and (z) a third bet level which is greater than the second bet level;

(ii) a second condition which requires the bet to be equal to the maximum bet level;

(b) start a play of the game;

(c) in response to the received bet satisfying the first condition, provide an opportunity to obtain: (i) one of a plurality of awards, and (ii) at least one As Is award as a result of the play of the game, the at least one As Is award being selected from the group consisting of a static jackpot award, a progressive jackpot award, and tangible personal property, the opportunity being provided regardless of whether the bet level of the received bet is equal to the first, second, or third bet level:

(x) the plurality of awards including:

(1) a first award which is available if the bet level of the received bet is equal to the first bet level, the first award having an amount which depends upon the first bet level;

(2) a second award which is available if the bet level of the received bet is equal to the second bet level, the second award having an amount which depends upon the second bet level, the second award being greater than the first award;

(3) a third award which is available if the bet level of the received bet is equal to the third bet level, the third award having an amount which depends upon the third bet level, the third award being greater than the second award, the first, second and third awards corresponding to the first, second and third bet levels so as to define a non-linear award progression;

(d) in response to the received bet satisfying the second condition, providing an opportunity to obtain the at least one As Is award as a result of the play of the game; and (e) indicate any one of the awards obtained.

36. The gaming system of claim 35, wherein the As Is award has a maximum prize value available for the play of the game.

37. The gaming system of claim 35, which includes a plurality of As Is awards, each of the As Is awards being selected from the group consisting of a static jackpot award, a progressive jackpot award, and tangible personal property.

* * * * *

UNITED STATES PATENT AND TRADEMARK OFFICE

CERTIFICATE OF CORRECTION

PATENT NO. : 7,507,156 B2
APPLICATION NO. : 11/145846
DATED : March 24, 2009
INVENTOR(S) : Mark C. Nicely It is certified that error appears in the above-identified patent and that said Letters Patent is hereby corrected as shown below:

In Column 1, Line 44, change “distributed play mechanism” to --distributed play mechanisms--.

In Column 3, Line 58, change “two units is place” to --two units is placed--.

In Column 3, Lines 66-67, change “for three coin max unit bet” to --for a three coin max unit bet--.

In Column 4, Lines 52-53, change “the present invention are applied” to --the present invention is applied--.

In Column 8, Lines 37-38, change “such as multi-coin multi-line slot games” to --such as multi-coin multi-line slot game--.

In Claim 25, Column 11, Line 57, change “receive a bet a play” to --receive a bet for a play--.

Signed and Sealed this

Twenty-fourth Day of November, 2009

David J. Kappos

David J. Kappos
*Director of the United States Patent and Trademark Office*